United States Patent [19]

Kinoshita

[11] Patent Number: 5,070,406

[45] Date of Patent: Dec. 3, 1991

[54] IMAGE SENSING APPARATUS HAVING A LOW-RESOLUTION MONITOR, MEANS FOR REDUCING THE AMOUNT OF INFORMATION IN AN IMAGE SIGNAL, AND SWITCHING MEANS FOR REDUCING POWER CONSUMPTION IN VARIOUS OPERATING MODES

[75] Inventor: Takao Kinoshita, Tokyo, Japan

[73] Assignee: Canon Kabushiki Kaisha, Tokyo, Japan

[21] Appl. No.: 490,147

[22] Filed: Mar. 7, 1990

Related U.S. Application Data

[60] Division of Ser. No. 390,431, Aug. 3, 1989, Pat. No. 4,928,137, which is a continuation of Ser. No. 134,179, Dec. 17, 1987, abandoned, which is a division of Ser. No. 682,936, Dec. 18, 1984, Pat. No. 4,740,828.

[30] Foreign Application Priority Data

| Dec. 24, 1983 | [JP] | Japan | 58-245847 |
| Dec. 24, 1983 | [JP] | Japan | 58-245848 |
| Dec. 28, 1983 | [JP] | Japan | 58-251736 |
| Dec. 28, 1983 | [JP] | Japan | 58-251737 |

[51] Int. Cl.[5] ............ H04N 5/30; H04N 9/07; H04N 5/225
[52] U.S. Cl. .................... 358/224; 358/43; 358/909; 358/213.26; 358/213.11
[58] Field of Search ............... 358/44, 183, 224, 287, 358/906, 909, 41, 213.11, 213.13, 213.22, 213.23, 213.25, 213.26, 213.27, 213.28, 213.29, 48, 43, 140, 209, 217, 56, 64; 360/9.1, 33.1

[56] References Cited

U.S. PATENT DOCUMENTS

| 3,931,636 | 1/1976 | Scheider | 358/10 |
| 4,266,242 | 5/1981 | McCoy | 358/22 |
| 4,394,693 | 7/1983 | Shirley | 358/298 |
| 4,449,143 | 5/1984 | Dischert et al. | 358/11 |
| 4,475,131 | 10/1984 | Nishizawa et al. | 358/335 |
| 4,486,783 | 12/1984 | Tanaka et al. | 358/213.25 |
| 4,499,496 | 2/1985 | Tanaka et al. | 358/213.25 |
| 4,513,313 | 4/1985 | Kinoshita et al. | 358/44 |
| 4,531,164 | 7/1985 | Maeda et al. | 360/33.1 |
| 4,541,010 | 9/1985 | Alston | 358/44 |
| 4,546,390 | 10/1985 | Konishi et al. | 360/10.3 |
| 4,553,159 | 11/1985 | Moraillon | 358/44 |
| 4,571,627 | 2/1986 | Stempeck | 358/224 |
| 4,581,652 | 4/1986 | Kinoshita et al. | 358/213.29 |
| 4,589,029 | 5/1986 | Torimaru et al. | 358/224 |
| 4,603,354 | 7/1986 | Hashimoto et al. | 358/213.25 |
| 4,635,122 | 1/1987 | Kato et al. | 358/213.25 |
| 4,740,828 | 4/1988 | Kinoshita | 358/48 |
| 4,811,106 | 3/1989 | Burt et al. | 358/213.26 |
| 4,928,137 | 5/1990 | Kinoshita | 358/213.26 |
| 4,959,735 | 9/1990 | Kawai | 358/342 |

FOREIGN PATENT DOCUMENTS

| 0078280 | 5/1982 | Japan | 358/909 |
| 0128075 | 7/1983 | Japan | 358/906 |
| 0139571 | 8/1983 | Japan | 358/906 |
| 0220577 | 12/1983 | Japan | 358/909 |
| 0105780 | 6/1984 | Japan | 358/909 |

*Primary Examiner*—James J. Groody
*Assistant Examiner*—Safet Metjahic
*Attorney, Agent, or Firm*—Toren, McGeady & Associates

[57] ABSTRACT

An image sensing apparatus is provided with an image sensor; an electronic monitor having a number of scanning lines fewer than the vertical picture elements of the image sensor; and a driving circuit driving the image sensor with a fewer number of scanning lines when the apparatus is in a monitor mode than in an image sensing mode. The driving circuit is arranged to drive the image sensor in a non-interlacing manner in the monitor mode.

14 Claims, 10 Drawing Sheets

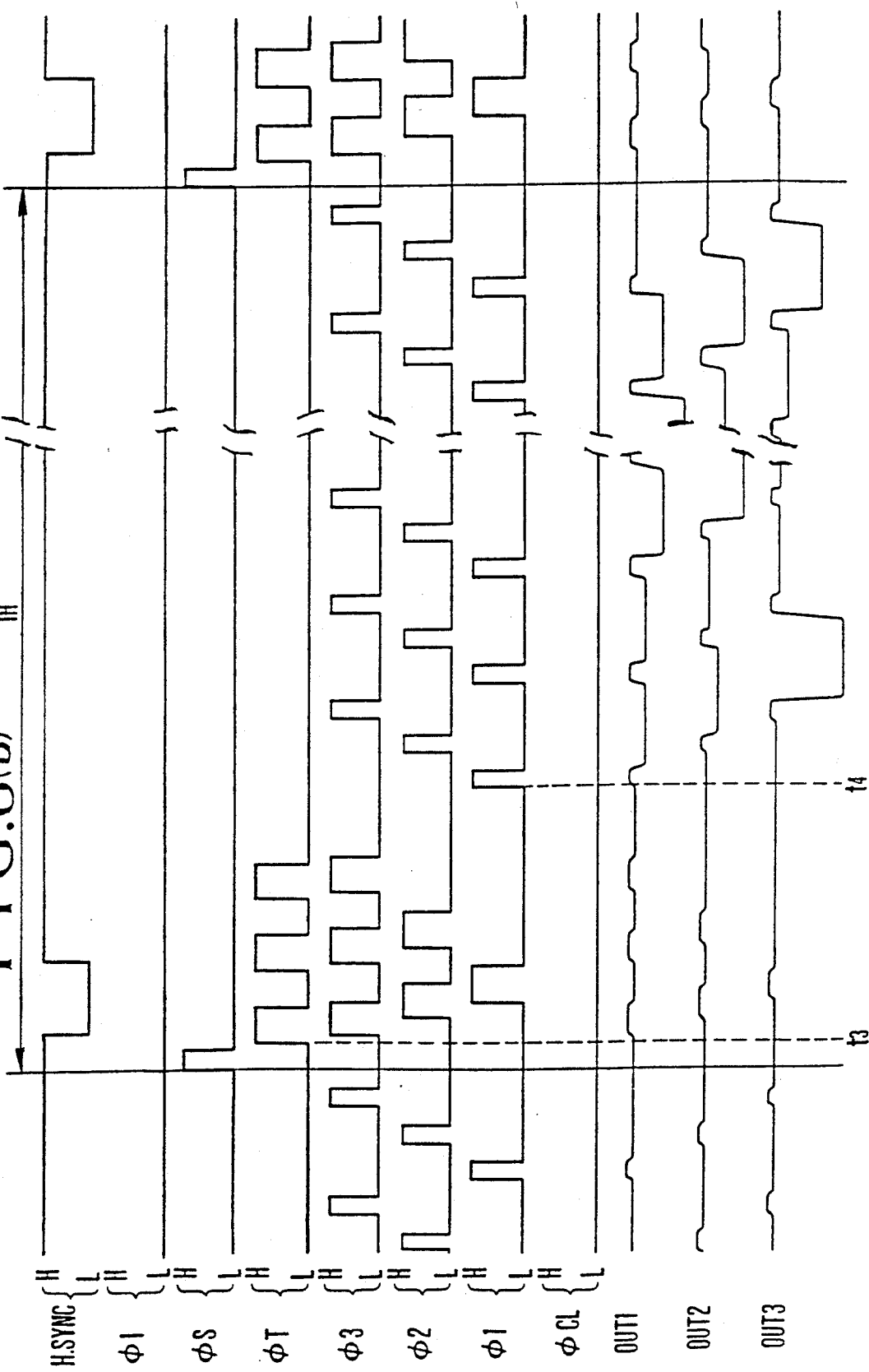

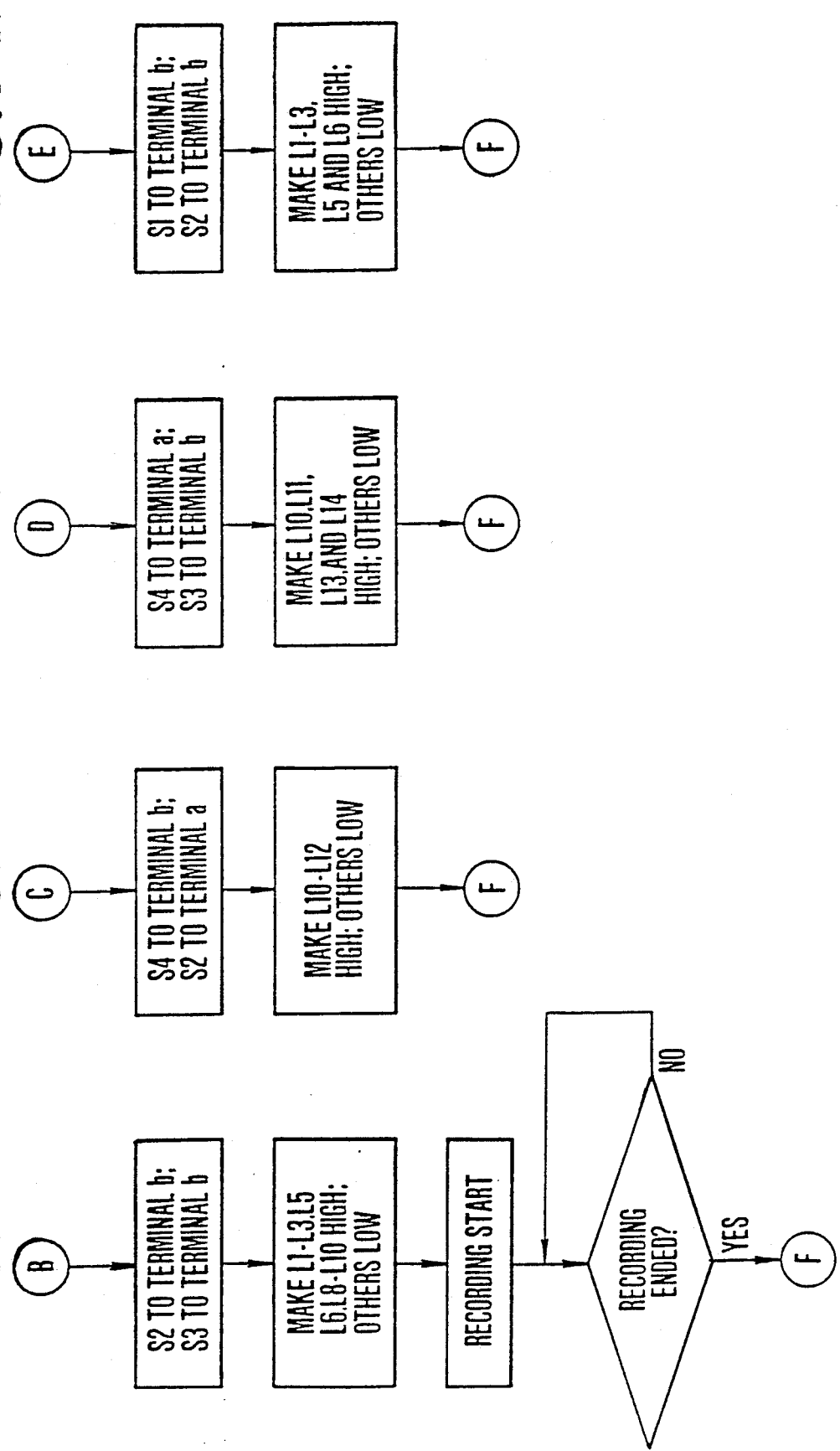

IMAGE SENSING APPARATUS HAVING A LOW-RESOLUTION MONITOR, MEANS FOR REDUCING THE AMOUNT OF INFORMATION IN AN IMAGE SIGNAL, AND SWITCHING MEANS FOR REDUCING POWER CONSUMPTION IN VARIOUS OPERATING MODES

This is a divisional application of Ser. No. 07/390,431, filed Aug. 3, 1989, U.S. Pat. No. 4,928,137 which in turn is a continuation application of Ser. No. 07/134,179, filed Dec. 17, 1987, now abandoned which in turn is a divisional application of Ser. No. 06/682,936, filed Dec. 18, 1984 U.S. Pat. No. 4,740,828.

BACKGROUND OF THE INVENTION

1. Field of the Invention

This invention relates to an image sensing apparatus having an electronic monitor and means for changing a manner in which an image sensor, etc. are driven and a manner in which power supply is effected to peripheral circuits when the apparatus is in a monitor mode.

2. Description of the Prior Art

The image sensing apparatuses such as electronic cameras are highly promising apparatuses capable of replacing the cameras of the kind using silver halide. However, they have some basic problems. The first of such problems relates to power consumption. In intermittently taking still pictures, the power consumption presents no serious problem. However, in cases where an electronic monitor is connected to or mounted on the camera in particular, an image sensing system or a reproducing system must be kept continuously driven for continuous monitoring or play back. Such a requirement then presents a grave problem in connection with power consumption.

A second problem relates to the performance of the electronic monitor such as the resolving power of the monitor. An insufficient resolving power of the monitor would bring about a spurious resolution or the like when an image signal is monitored through the same signal processing arrangement as in recording or reproduction. Further, in case that the monitor does not possess an adequate power in relation to the image sensing or recording power, that is, in cases where the monitor is for a black-and-white signal while the image sensing or recording signal is a color signal or where the reproduction band of the monitor is narrower than the image sensing or recording band, there arises a loss of electric energy and degradation of picture quality.

A third problem with the prior art apparatuses lies in the relation between the resolving power of the monitor and the manner in which the image sensor is driven. Heretofore, a monitoring image signal has been obtained by driving an image sensor in the same manner as in recording or reproduction. A monitor device is thus required to have a high degree of performance. Particularly, the resolving power in the vertical direction of the monitor is required to be equal to that of the image sensor. The monitor arrangement of the prior art thus has resulted in a high cost.

Whereas, no particular attention has been paid to these problems in the image sensing apparatuses of the prior art such as electronic cameras, facsimile devices, copying machines, etc.

SUMMARY OF THE INVENTION

It is an object of this invention to provide an image sensing apparatus whereby the above-stated third problem of the prior art can be solved by adoption of means for having a monitoring function adequately performed with a low-cost, simple electronic monitor which has a number of scanning lines fewer than the number of vertical picture elements of an image sensor.

It is another object of this invention to provide an image sensing apparatus wherein an electronic monitor which has a number of scanning lines fewer than the number of vertical picture elements of an image sensor is arranged in combination with means for preventing degradation of sensitivity due to a difference in the number of scanning lines for driving the image sensor.

It is a further object of this invention to provide an image sensing apparatus whereby the first of the above-stated problems of the prior art is solved by using a built-in electronic monitor in combination with power saving means which reduces electric energy consumption of the apparatus when it is in a monitor mode or a reproduction mode using the built-in electronic monitor.

It is a still further object of this invention to provide an image sensing apparatus wherein, in the event that a built-in electronic monitor of a low resolving power is used for the apparatus, the second of the above-stated problems of the prior art is solved with the monitor arranged to be capable of adequately suppressing occurrence of a spurious resolution when the apparatus is in a monitoring or reproduction mode using the built-in electronic monitor.

An embodiment of this invention is provided with means for driving the image sensor with a fewer number of scanning lines when the apparatus is in a monitor mode than in an image sensing mode, so that a monitoring purpose can be adequately accomplished even with an electronic monitor having a number of scanning lines fewer than the number of the vertical picture elements of the image sensor.

Further, another embodiment of this invention is provided with switching means which is arranged to change an image sensor driving operation to have signal electric charges of picture elements added together when the apparatus is in a monitor mode using an electronic monitor. Therefore, monitoring can be adequately accomplished even in the event that the electronic monitor used has the picture elements thereof arranged in a different way from those of the image sensor. It is an especially advantageous point of this embodiment that, in case where an electronic monitor having a number of scanning lines fewer than the number of vertical picture elements of the image sensor is used, degradation in sensitivity due to a difference in the number of scanning lines driving the image sensor can be prevented by virtue of the switching means.

A further embodiment of the invention is provided with power saving means which is arranged to bring the operations of parts not required for monitoring to a stop or to have power supply to such unnecessary parts cut down when the apparatus is in a monitor mode using a built-in electronic monitor, so that electric energy can be saved to a great extent.

A still further embodiment of this invention is provided with power saving means which is arranged to bring the operations of parts not required for a reproducing operation to a stop or to have power supply to such unnecessary parts cut down when the apparatus is in a reproducing mode using a built-in electronic monitor, so that electric power consumption of the apparatus as a whole can be lowered to a great extent.

A combination of these embodiments possibly saves ⅓ to ½ of the power consumption of the whole apparatus. The independent or combined application of the above-stated features of the invention permits simplification of the power supply arrangement of the apparatus. For example, the capacity of a DC-to-DC converter can be lessened.

Further, in an embodiment of this invention, there is provided switching means for shifting the image-sensing-system signal processing method of the apparatus to a method suited for a monitor mode using a built-in monitor when the apparatus is brought into the monitor mode, so that occurrence of a spurious resolution in the monitor mode can be sufficiently prevented even in the event of a low resolving power of the built-in electronic monitor.

In another embodiment of this invention, there is provided switching means for shifting the reproduction-system signal processing method of the apparatus to a method suited for reproduction by a built-in electronic monitor when the apparatus is brought into the reproduction mode using the monitor, so that occurrence of a spurious resolution during reproduction with the monitor can be sufficiently prevented even in the event of a low resolving power of the monitor.

These and further objects and features of the invention will become apparent from the following detailed description of preferred embodiments thereof taken in connection with the accompanying drawings.

BRIEF DESCRIPTION OF THE DRAWINGS

FIGS. 6(a) and 6(b) are charts respectively showing the clock timing for the vertical and horizontal transfer operations of the image sensor of FIG. 4.

FIGS. 7(a)-7(f) illustrate a control operation on a power supply system within the electronic camera of FIG. 1. Of these drawings, FIG. 7(a) is a main routine flow chart; and FIGS. 7(b), 7(c), 7(d), 7(e) and 7(f) are sub-routine flow charts respectively for a monitor mode, a recording mode, an external reproduction mode, a monitor reproduction mode and an external monitor mode (or an external recording mode).

DETAILED DESCRIPTION OF THE PREFERRED EMBODIMENTS

Figure 1:
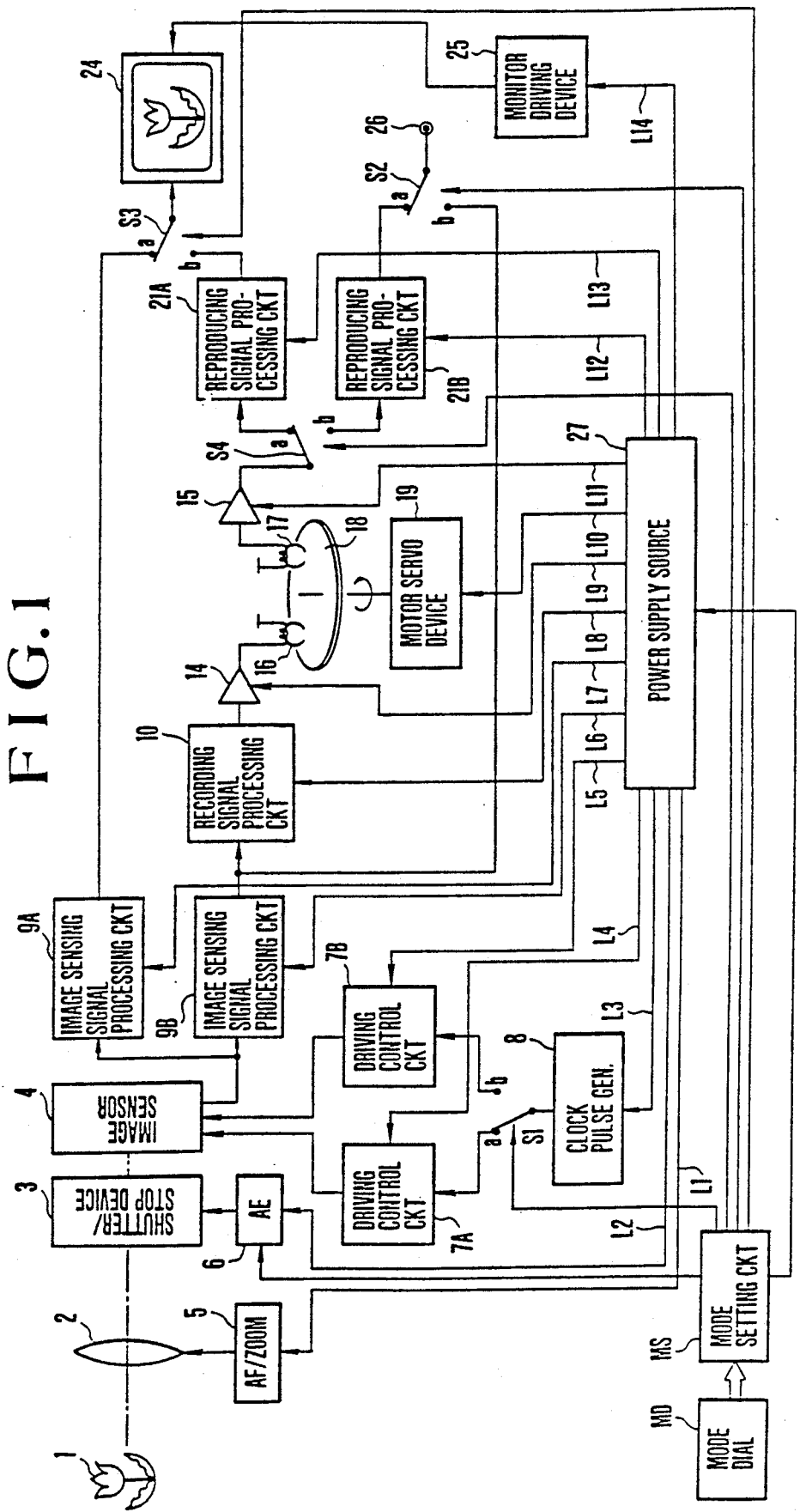
FIG. 1 is a block diagram showing an electronic camera to which this invention is applied as an embodiment thereof.

The following description shows the arrangement made for attaining the above-stated objects of the invention with reference to the accompanying drawings:

FIG. 1 shows the whole arrangement of an electronic camera which represents an example of the image sensing apparatus according to this invention as an embodiment thereof. An optical image of an object 1 to be photographed comes to the surface of an image sensor 4 through an image sensing optical system 2 such as a lens system and a shutter/stop device 3. The image sensor 4 may be a solid-state image sensor such as a two- or one-dimensional CCD or a camera tube. The embodiment, however, uses a two-dimensional CCD as the image sensor 4. An automatic focusing (AF)/zoom drive control device 5 is arranged to control the focal point, focal length, etc. of the image sensing optical system 2. A shutter/stop drive control device 6 is arranged to drive and control the shutter/stop device 3 for automatic exposure control (AE). The arrangment and the functions of these elements and devices are well known and thus require no detailed description herein.

The embodiment is provided with driving control circuits 7A and 7B for driving the image sensor 4. These circuits 7A and 7B are arranged to control impedance, the level and the rise and fall time of pulses. The circuit 7A is for a monitor mode which will be described later herein and the other circuit 7B for an image sensing mode which will be also described later. With a selector S1 operated, clock pulses generated by a clock pulse generator 8 are supplied to either of these driving control circuits 7A and 7B according to the one of the above-stated modes selected. To facilitate understanding, the driving control circuits 7A and 7B are separately shown in different blocks. However, they may be arranged to have some of their component parts arranged in common. Further, they may be arranged in one circuit to have all the component parts of them arranged in common with the circuit constant arranged to be mechanically or electrically variable. Similar modifications or variations also apply to image sensing signal processing circuits 9A and 9B and reproduction signal processing circuits 21A and 21B which will be described later. The above-stated image sensing mode includes a recording mode; an external recording mode or an external monitor mode using an external monitor of a high resolving power; and any other mode in which the image sensor is driven for the image sensing purpose.

The output of the image sensor 4 is supplied to either of the image sensing signal processing circuits 9A and 9B, which process the output of the sensor 4 according as the camera is set in the monitor mode or in the recording mode. The output terminal of the processing circuit 9A is connected to the terminal "a" of the selector S3. Meanwhile the output terminal of the other processing circuit 9B is connected to the input terminal of a recording signal processing circuit 10 and also to the terminal "b" of the selector S2. The recording signal processing circuit 10 is arranged to convert the output of the image sensing signal processing circuit 9B into a signal suited for recording. The output of the circuit 10 is supplied via a recording amplifier 14 to a recording head 16 to be recorded thereby on a magnetic disc 18 which is a record bearing medium. Although the disc 18 is shown in FIG. 1, a magnetic tape or any of other record bearing media adapted for optical recording, photo-magnetic recording, magnetic bubble memory recording, etc. may be employed as the record bearing medium in place of the magnetic disc. Further, the recording head 16 may be arranged to serve also as reproducing head in place of a reproducing head 17 which will be described later. The magnetic disc 18 is arranged to be driven and controlled by a motor servo device 19.

A signal which is recorded or has previously been recorded on the magnetic disc 18 is read out by the reproducing head 17. The signal thus read out is supplied either to the reproduction signal processing circuit 21A or the other reproduction signal processing circuit 21B according to the position of a selector S4. The processing circuits 21A and 21B are arranged to supply the reproduced signal to a built-in monitor 24 and to an external monitor (not shown). Their output terminals are respectively connected to the terminal "b" of the selector S3 and the terminal "a" of the selector S2. The monitor 24 is composed of, for example, a liquid crystal display device (LCD), an electro-chrominance display device (ECD), a cathode-ray display tube, or the like. A monitor driving device 25 is arranged to drive and control the monitor 24. An external video output terminal 26 is connected to the common terminal of the selector S2. A power supply source 27 is arranged to effect power supply to each of the above-stated circuits and devices via connection lines L1-L14.

In the case of this embodiment, the number of scanning lines of the built-in monitor of the electronic camera is fewer than the number of vertical picture elements of the image sensor. The image sensor is therefore arranged to be driven with a fewer number of scanning lines when the camera is in the monitor mode than in the image sensing mode in such a way as to make the monitor compatible with the image sensor.

The electronic camera shown in FIG. 1 can be set in each of the different modes including the monitor mode, the recording mode, the monitor reproduction mode, the [external monitor mode, the external recording mode and the external reproduction mode by setting the selectors S1-S4 in the following manner:

1) In the monitor mode, the selector S1 is connected to the terminal "a" thereof while the selector S3 is connected to the terminal "b" thereof.

2) In the recording mode, the selector S1 is connected to the terminal "b" thereof while the selector S3 is connected to the terminal "b" thereof.

3) In the monitor reproduction mode, the selector 4 is connected to the terminal "a" thereof while the selector S3 is connected to the terminal "b" thereof.

4) In the external monitor mode and external recording mode, the selector S1 is connected to the terminal "b" and the selector S2 to the terminal "b" thereof.

5) In the external reproduction mode, the selector S4 is connected to the terminal "b" thereof and the selector 2 to the terminal "a" thereof.

In the case of each of the above-stated external modes, each signal is supplied via the external video output terminal 26 to each applicable external device.

The selectors S1-S4 which serve as mode selection switches are arranged to be operated in response to a release operation. These selectors are under the control of the output of a mode setting circuit MS which is arranged to form a code signal in response to the operation of a mode dial MD. Further, the selector S3 may be arranged to be connected to the terminal "a" instead of the terminal "b" in the recording mode. In addition to that modification, the above-stated arrangement for switch-over from one circuit to the other of FIG. 1 may be arranged in different manners. When one of the above-stated mode is selected with the selectors S1-S4 set in their positions as mentioned above, power supply from the power supply source 27 to parts (circuits or devices) of the electronic camera of FIG. 1 which are not necessary for the selected mode is either cut off or cut down in a manner as will be described later herein.

Figure 2:
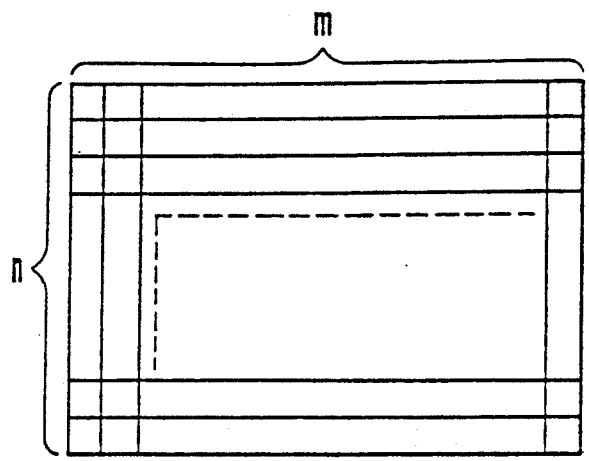
FIG. 2 is an illustration of arrangement of the picture elements of an electronic monitor included in the electronic camera of FIG. 1.
Figure 3A:
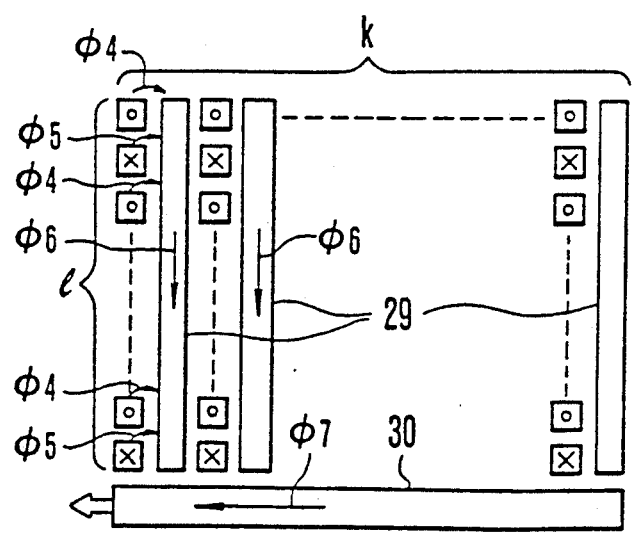
FIGS. 3(a)-3(g) are illustrations of the mode of driving an image sensor of the same electronic camera.

When the driving control circuits 7A and 7B are switched over from one position or terminal to the other the details of the scanning and signal reading operations on the image sensor 4 are as follows: The built-in electronic monitor 24 of the electronic camera is assumed to have a number "n" of vertical display lines and a number "m" of horizontal display lines as shown in FIG. 2. The image sensor 4 is assumed to have a number "l" of vertical picture elements and a number "k" of columns of vertical registers 29 as shown in FIG. 3(a). There obtain the following relations: $l > n$ and $k > m$. The image sensor 4 is assumed to be an inter-line CCD (the same applies to other kinds of solid-state photo sensor or a camera tube). Referring to FIG. 3(a), the signals of picture elements indicated by marks "o" and "x" are transferred to the vertical shift registers 29 by means of pulses $\phi 4$ and $\phi 5$. The signals within the registers 29 are then transferred by pulses $\phi 6$ downward, as viewed on the drawing, to a horizontal shift register 30. Further, the signals within the horizontal shift register 30 are transferred by means of pulses $\phi 7$ to the left, as viewed on the drawing, and are then read out as an image signal.

When the embodiment is in the monitor mode, the clock signal produced from the clock pulse generator 8 is supplied to the driving control circuit 7A. The circuit 7A then produces driving pulses as shown in FIG. 3(c).

Figure 3B:
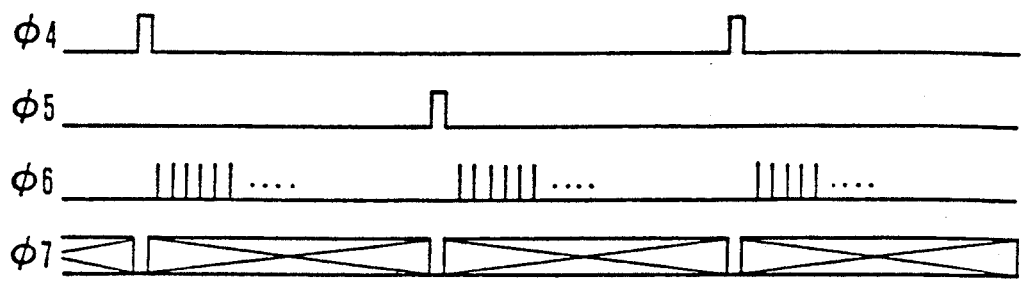
Figure 3C:
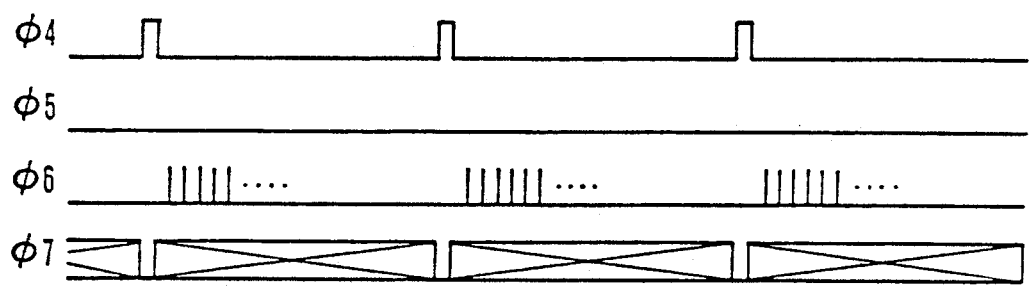

Meanwhile, in the image sensing mode which is not in combination with the monitor mode, the driving control circuit 7B produces pulses as shown in FIG. 3(b).

In the image sensing mode, the pulses $\phi 4$ are produced at a rate of one for every two fields in synchronism with a vertical synchronizing signal. The pulses $\phi 5$ have their phase differing 180 degrees from that of the pulses $\phi 4$ and are supplied at the same period as that of the pulses $\phi 4$. The pulses $\phi 6$ are supplied within a horizontal blanking period at every horizontal period (1H). Meanwhile, the pulses $\phi 7$ are produced to constantly drive the horizontal shift register at a high speed while the pulses $\phi 4$ and $\phi 5$ are at a low level. In the image sensing mode, therefore, each of the picture elements marked "o" and "x" is caused to accumulate electric charge for two fields and their signals are alternately read out at every field.

Next, in the monitor mode, the pulses $\phi 4$ alone are produced at every field while the pulses $\phi 5$ are not supplied. Therefore, a signal accumulated by each of the picture elements marked "o" for one field period alone is read out at every field.

In other words, while interlacing is performed in the image sensing mode, no interlacing is performed in the monitor mode.

In accordance with the above-stated driving method employed in this embodiment, the effective accumulation time of the sensor decreases by half and thus results in a lowered sensitivity. However, flickering (or vertical vibrations) of the image on the monitor disappears. In the monitor mode using the built-in monitor 24, the image sensor 4 is driven in a non-interlacing manner. However, in the external monitor mode using an external monitor of a high vertical resolving power, the image sensor 4 is of course driven in a normal interlacing manner.

As mentioned above, in the monitor mode, mere arrangement to drive the image sensor 4 with a number of scanning lines fewer than the scanning lines used in the image sensing mode results in a lowered sensitivity. This problem can be solved by shifting the image sensor driving operation to a driving operation in which a signal electric charges are added together. For example, the signal electric charge is added within the vertical shift registers 29 as mentioned in the foregoing. However, the image sensor is still driven in the non-interlacing manner as long as the pairs of picture elements to which the adding up arrangement applies are not changed for every field. This arrangement effectively prevents the degradation of sensitivity as well as the flicker of the image. FIGS. 3(d)-3(g) show a second embodiment of this invention which is arranged in this manner.

Figure 3D:
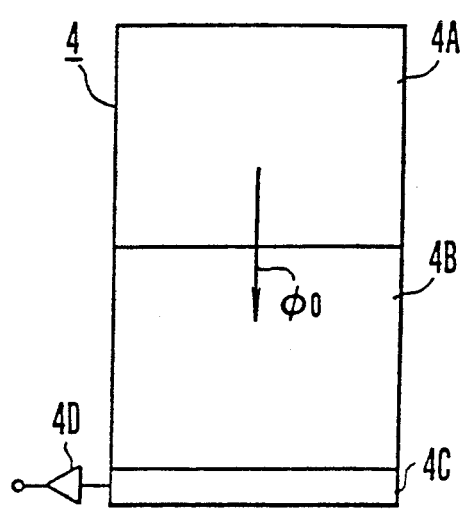

In the second embodiment a frame transfer type CCD is employed as the image sensor 4. Referring to FIG. 3(d), the image sensor consists of an image sensing part 4A; a memory part 4B; a horizontal shift register 4C; and an output amplifier 4D. A reference symbol $\phi 0$ denotes pulses for vertically transferring the electric charges within the image sensing part 4A and the memory part 4B.

Figure 3E:
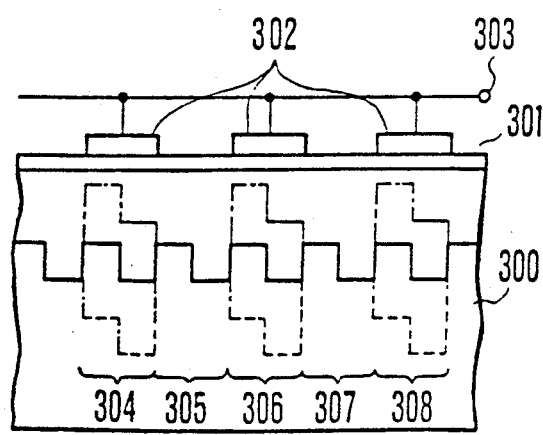

Referring to FIG. 3(e) which is a schematic sectional view of the image sensing part 4A, the image sensing part consists of a semiconductor substrate 300 which is of, for example, the P type; an insulation layer 301; transparent electrodes 302; a lead wire 303 which is arranged to have the above-stated pulses $\phi 0$ impressed thereon. Within each of areas 304, 306 and 308 which are beneath the electrodes 302 and within other areas 305, 307 and 309, a stepwise potential difference results from ion injection. The potential becomes indicated by a broken line in the drawing when the pulse $\phi 0$ is impressed at a high level on the electrode 302 and to become as indicated by a one-dot-chain line when the pulse is impressed at a low level. Further, the drawing shows the potential as viewed in terms of electrons. The probability of existence of electrons increases according as the potential level decreases.

Figure 3F:
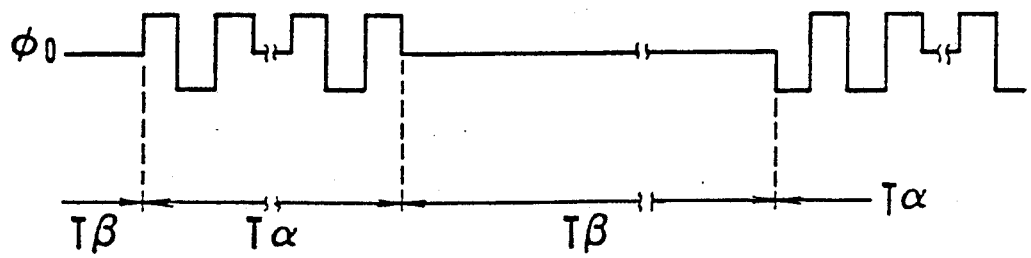
Figure 3G:
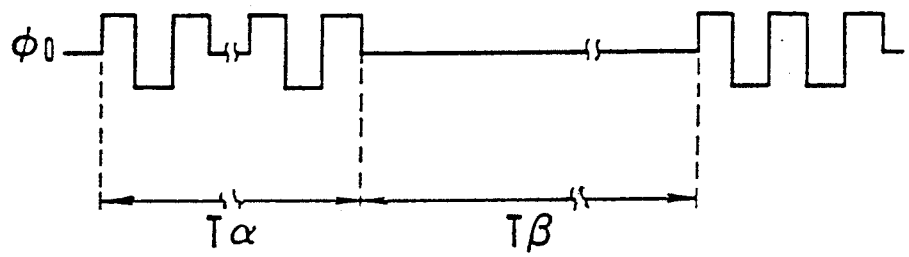

Referring to FIG. 3(f) which shows the vertical transfer pulses $\phi 0$ as in the image sensing mode, a vertical transfer period T$\alpha$ appears alternately with an accumulation period T$\beta$. In the first field after the accumulation period T$\beta$, the pulse $\phi 0$ rises to have the electric charges accumulated in the areas 305 and 306 added up in the area 306 and those of the areas 307 and 308 added up in the area 308 to form each line information. In the second field after the accumulation period T$\beta$, the pulse $\phi 0$ falls to have the electric charges of the areas 304 and 305 added up in the area 305 and those of the areas 306 and 307 added up in the area 307, respectively. Interlacing is performed for every field in this manner.

Whereas, in the monitor mode in the case of this embodiment, the pulses $\phi 0$ are arranged to have the same wave form both in the first and second fields. Therefore, interlacing driving is carried out with the same pairs of electric charges thus added up for the signals of these fields. The sensitivity never degrades.

The addition or summing of signal electric charges may be carried out in a different way. For example, in shifting the signal electric charges to the horizontal register 30 shown in FIG. 3(a), the vertical electric charges may be subjected to addition to have them increased two times, three times, or the like. It is also possible to carry out addition of the signal electric charges at an output stage for an increase in sensitivity by lowering the reset pulse driving frequency for the output amplifier of the image sensor 4. These methods are advantageous in cases where the monitor possesses a low resolving power in the horizontal direction.

In driving the image sensor to give a signal of fewer picture elements in the monitor mode than in the image sensing mode, the signal electric charge adding up arrangement of the second embodiment effectively increases the sensitivity of the sensor to make up for the decreased resolving power, so that the performance of the monitor (view finder) can be enhanced.

FIGS. 4-6(a) and 6(b) show a third embodiment of this invention. In this embodiment, the image sensor has a plurality of horizontal shift registers; the sensitivity of the sensor is arranged to be increased by changing the sensor driving operation in such a way as to consolidate the horizontal shift registers into one; and the number of bits in the horizontal direction is decreased. In this case, a black-and-white signal is processed in the monitor mode while a color signal is processed in the image sensing mode.

Figure 4:
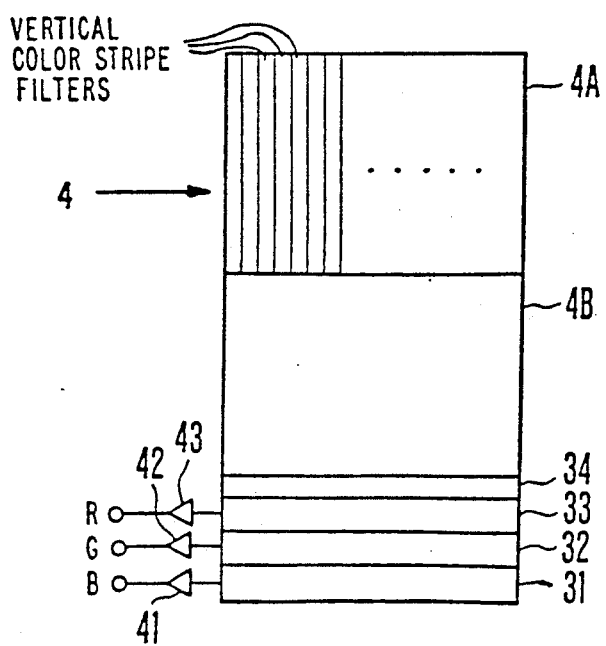
FIG. 4 is a schematic illustration of the arrangement of the image sensor included in the same electronic camera in which an electric signal charge is arranged to be added by means of a horizontal shift register.

The arrangment of the image sensor of this embodiment is schematically shown in FIG. 4. This sensor is a frame transfer type solid-state image sensor. A plurality of vertical color stripe filters for color separation are applied to the front side of an image sensing part 4A in positions according to picture elements. These filters include, for example, R, G and B filters. The sensor includes horizontal shift registers corresponding to B, G and R signals; a separate input part 34; electric charge-to-voltage conversion amplifiers 41-43 for B, G and R signals. The three horizontal shift registers 31-33 provide reading transfer routes for different kinds of chrominance signals to be obtained. The electric charges corresponding to each of different colors are respectively supplied to the applicable one of the horizontal shift registers 31-33 for reading out. Accordingly, the signal of each color is substantially sampled at the horizontal register 31, 32 or 33. Then, each color or chrominance signal is separated from another and is produced from one of these amplifiers 41, 42 and 43.

Figure 5:
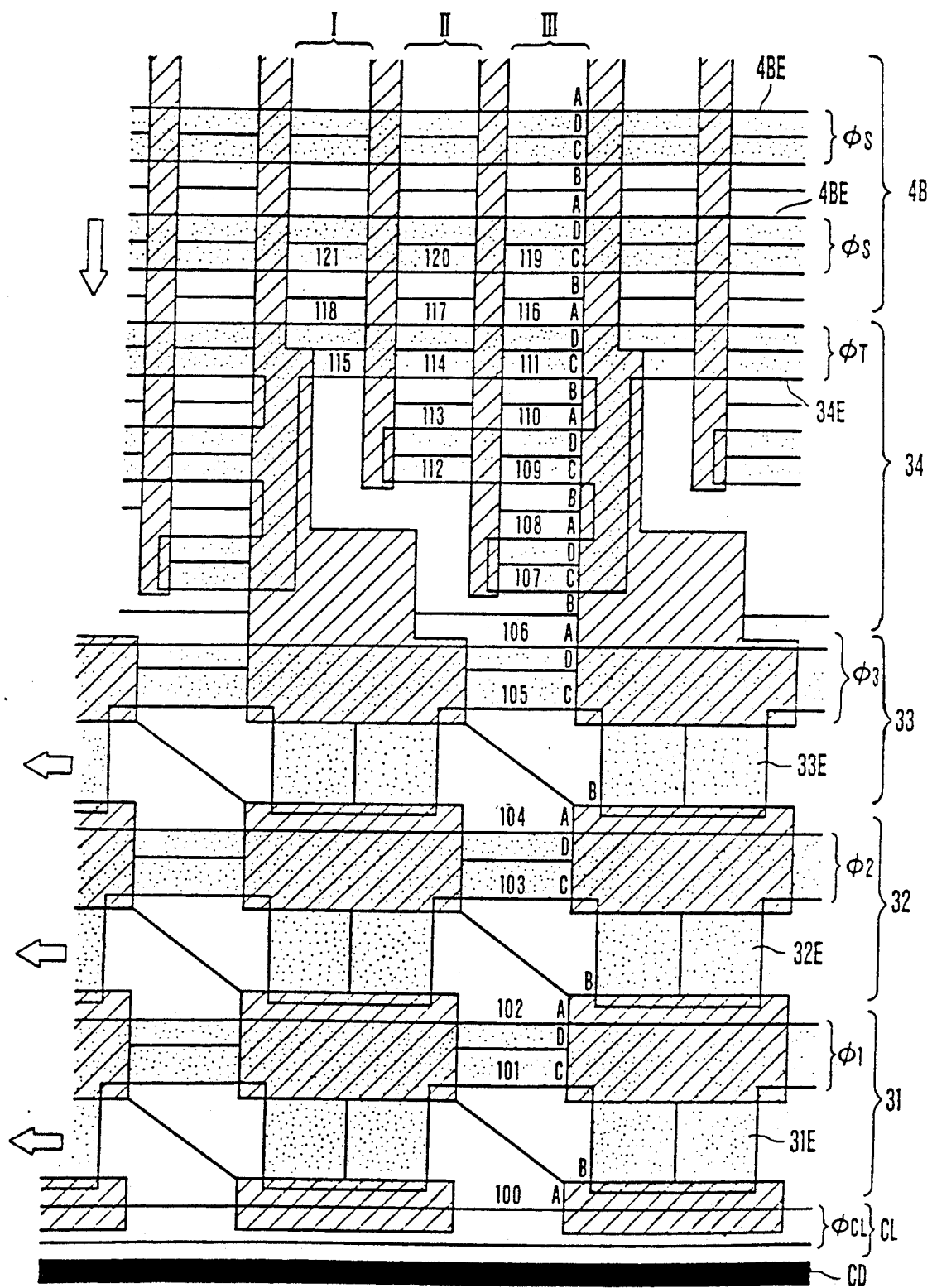
FIG. 5 is a detailed illustration of the electrode arrangement of the image sensor of FIG. 4.

FIG. 5 shows the arrangement of electrodes in the essential parts of the image sensor of FIG. 4. The illustration in FIG. 5 includes the lower end portion of the memory part 4B and the details of the three horizontal shift registers 31, 32 and 33.

While it is not shown in FIG. 4, an electric charge clearing gate CL is disposed in the lowest part of the image sensor of this embodiment and right below the lower side of the horizontal shift register 31. An electric charge clearing drain CD is arranged via the electric charge clearing gate CL and is connected to a power supply. In between the memory part 4B and the three horizontal shift registers 31-33 is interposed the separate input part 34 which performs a sort of parallel-series converting operation. In other words, information signals on three colors contained in the last horizontal line of the memory part 4B are separated and supplied from this part 34 to these three horizontal shift registers as applicable.

In FIG. 5, hatched parts represent channel stops and dotted parts electrodes. The horizontal shift registers 31-33 are respectively provided with transfer electrodes 31E-33E; the separate input part 34 with a transfer electrode 34; and the memory part 4B with a transfer electrode 4BE. In this specific embodiment, the transfer operation is arranged to be carried out by one phase driving. However, it may be arranged to be carried out by multi-phase driving in two or more phases.

Figure 6A:
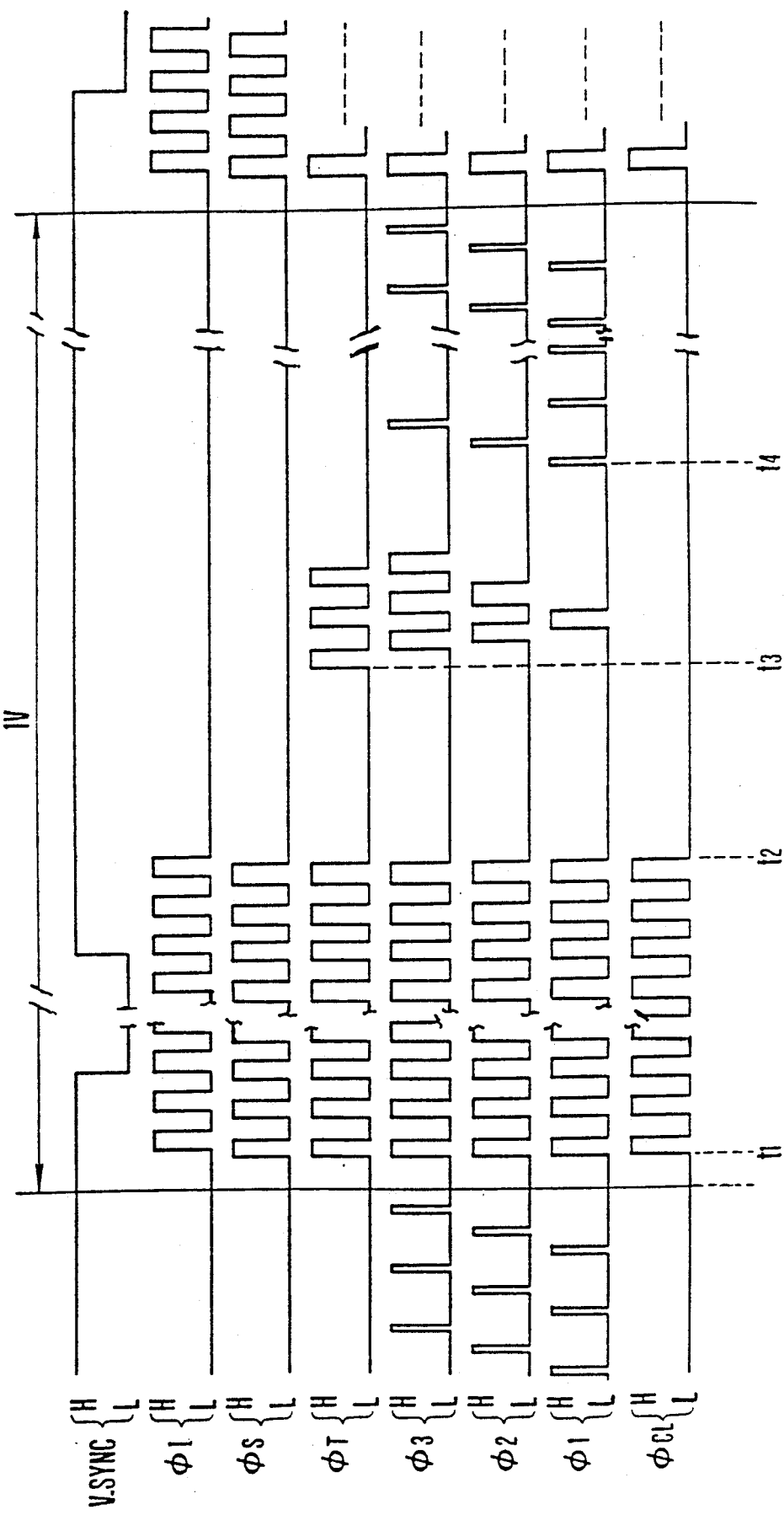

In the drawing, each set of parts A, B, C and D which is arranged upward from part A forms a unit cell. Assuming that the potentials in terms of electrons of the parts A-D of the unit cell are expressed as P(A)-P(D), a virtual phase is formed by ion injection or the like to have a relation of $P(A)<P(B)$. The potential levels are fixed. The parts C and D below each of the transfer electrodes are arranged to have their potentials always in a relation of $P(C)<P(D)$. There obtains a relation of $P(A)<P(B)<P(C)<P(D)$ when a low level potential is impressed on each electrode and another relation $P(C)<P(D)<P(A)<P(D)$ when a high level potential is impressed. Clock pulses impressed on the electrodes are indicated by symbols beginning with $\phi$. Pulses $\phi 1-\phi 3$ are arranged to be impressed on the electrodes 31E-33E; pulses $\phi T$ to be impressed on the electrode 34E; pulses $\phi S$ to be impressed on the electrode 4BE; and pulses $\phi CL$ to be impressed on the clearing gate CL. FIGS. 6(a) and 6(b) respectively show clock timing to be used for vertical and horizontal transfers. These clock pulses are to be used in the recording mode, the external recording or the external monitor mode. In FIGS. 6(a) and 6(b), clock pulses $\phi I$ are arranged to be applied to the image sensing part 4A.

The image sensor 4 which has electrodes arranged as shown in FIG. 5 operates as follows: Referring to FIG. 6(a), in the vertical transfer of the electric charge from the image sensing part 4A to the memory part 4B, the clock pulses $\phi 1$, $\phi S$, $\phi T$, $\phi 3$, $\phi 2$, $\phi 1$ and $\phi CL$ are supplied in synchronism with a vertical synchronizing signal V.SYNC with these pulses being in synchronism with each other during a period between points of time t1 and t2. These clock pulses are approximately inphase and are in number at least equal to the number of the vertical picture elements of the image sensing part 4A. By this, the electric charge remaining in the memory part 4B is discarded to the drain CD and, at the same time, the electric charge of the image sensing part 4A is transferred to and stored at the memory part 4B. After a point of time t3, accumulated electric charges of the last column of the memory part 4B are shifted by clock pulses $\phi S$ one line after another. Then, with clock pulses $\phi T$, $\phi 3$, $\phi 2$ and $\phi 1$ supplied as shown in the drawing, the information in the horizontal direction is divided for every three picture elements and supplied to the three horizontal shift registers 31-33 as applicable. Following this, the information in each of the registers are read out one after another after a point of time t4. Details of operation to be performed during the period between the points of time t3 and t4, that is, the operation to divide and selectively supply the information of the last line of the memory part 4B to the three horizontal shift registers 31-33 as applicable via the separate input part 34 is as described below with reference to FIGS. 5 and 6(a) and 6(b). For the sake of simplification of illustration, the following description is limited to the shift of electric charges taking place in three columns I, II, and III which are arranged as one set in the memory part 4B shown in FIG. 5. Other sets, each likewise consisting of three colums, are of course concurrently operating in the same manner.

At the point of time t3, when the level of the clock pulse $\phi T$ becomes a high level, the electric charges accumulated at parts 116, 117 and 118 in the last line of the memory part 4B respectively shift to parts 111, 114 and 115 within the separate input part 34. After that, when the level of the clock pulse $\phi T$ becomes low, the electric charges which have moved to these parts 111, 114 and 115 further moves to other parts 110, 113 and 106. A little later than the clock pulse $\phi T$, the clock pulses $\phi 3$, $\phi 2$ and $\phi 1$ are applied one after another. Then, the electric charge which is at first accumulated at the part 118 of the column I of the memory part 4B and is later transferred to the part 106 of the separate input part 34 moves via the parts 105 and 104 of the horizontal register 33, the parts 103 and 102 of the horizontal register 32 and the part 101 of the horizontal register 31 to the part 100 of the horizontal register 31 to be accumulated there.

Following this, when the clock pulse $\phi T$ is again applied, the electric charges which are at the parts 111 and 114 of the separate input part 34 come via parts 109 and 112 to parts 108 and 106. When the clock pulses $\phi 3$ and $\phi 2$ are applied one by one a little later than the clock pulse $\phi T$, the electric charge which is transferred to the part 106 of the separate input part 34 from the part 117 of the column II of the memory part 4B moves via parts 105, 104 and 103 to the part 102 of the horizontal register 32 to be accumulated there.

When the clock pulse $\phi T$ is applied once more, or for the third time, the electric charge which is at the part 108 of the separate input part 34 moves to another part 106 via the part 107 of the separate input part 34. Then, when the clock pulse $\phi 3$ is applied a little later than the clock pulse $\phi T$, the electric charge which is at first accumulated in the part 116 of the column III of the memory part 4B and is transferred to the part 106 of the separate input part 34 comes to move via the part 105 to the part 104 of the horizontal register 33 to be accumulated there.

The electric charges which have been accumulated in the last line of the memory part 4B are thus distributed in groups from the columns I, II and III via the separate input part 34 to the applicable one of the horizontal shift registers 31-33. In other words, with stripe filters of colors R, G and B applied to have the group of the column I covered by B, that of the column II by G and that of the column III by R, for example, an electric charge corresponding to B is accumulated in the horizontal register 31; an electric charge corresponding to G in the horizontal register 32; and an electric charge corresponding to R in the horizontal register 33 respectively.

At the point of time T4 and thereafter, the electric charges thus supplied to these horizontal registers 31, 32 and 33 are read out as shown at OUT1, OUT2 and OUT3 in FIG. 6(b). Upon completion of reading out of one horizontal line portion of electric charge of the memory part 4B through the horizontal shift registers 31, 32 and 33, the clock pulse $\phi S$ is applied to the memory part 4B as shown in FIG. 6(b). This causes the accumulated electric charge of each horizontal line to be vertically shifted to an extent corresponding to one horizontal line. As a result, a new electric charge is taken into the last line. After that, the above-stated operation between the points of time t3 and t4 is performed to have this new one line portion of accumulated electric charge distributed to the horizontal registers 31, 32 and 33.

The electric charges accumulated in all the lines of the memory part 4B are thus divided and separated for the different colors R, G and B and are read out with the above-stated operation repeatedly performed.

The operation described above is performed in the image sensing mode (or the recording mode, for example). In the monitor mode, this embodiment is arranged to have signal electric charges added up and consolidated in one horizontal shift register 33 for the purpose of increasing the sensitivity of the image sensor. In the case of the monitor mode, the clock pulses $\phi 3$ are alone used while other clock pulses $\phi 2$ and $\phi 1$ shown in FIGS. 6(a) and 6(b) are not used. The electric charges accumulated at the parts 118, 117 and 116 of the last line of the memory part 4B are moved to the parts 105 and 104 of the horizontal register 33 in the same manner as in the image sensing mode described in the foregoing. However, since other horizontal registers 32 and 31 never become a high level in this case, no electric charge moves to these registers. Therefore, all the electric charges are added up and consolidated at the horizontal shift register 33. In this instance, no chrominance signal is of course produced. However, since the monitor is arranged for a black-and-white signal (monitor 24 of FIG. 1), the above-stated arrangement does not affect the operation of the monitor.

Further, in the image sensing mode, or the recording mode for example, the electric charges of registers must be prevented from mixing with each other during the horizontal transfer of the electric charges supplied to the horizontal shift registers 31-33. For this purpose, there may be provided control gate means which separates each of these registers 31-33 from other registers. In another feasible method for preventing such mixing, the shift of the electric charge from a part A of each register shown in FIG. 5 to another part C is arranged to be made in a time sequence of register 33→register 32→register 31 and the shift of electric charge from the part C to the part A in a time sequence reverse to the above.

An experiment was conducted with the above-stated signal adding up arrangement applied to an image sensing system in which a frame transfer CCD having three horizontal registers of 780×490 cells was employed as the image sensor with a stripe color filter. Signals from the image sensing system were supplied to a black-and-white liquid crystal display device of 260×245 cells. In this experiment, the sensitivity was increased about 6 times as much as the sensitivity obtained in the image sensing mode. Since only one horizontal register was driven, the power consumption of the whole apparatus was reduced to ⅓ or thereabout.

In this embodiment, the control constant of a shutter/stop driving control device (6 of FIG. 1) for automatic exposure control is arranged to be switched over from one value to another according as the mode of the apparatus is shifted between the monitor mode and the image sensing mode by the mode setting circuit. The control constant thus varies according to the increase in the sensitivity of the sensor. Therefore, in case that the sensitivity changes with the mode switched over during the process of sensing an object image, the driving control on the shutter/stop device varies accordingly, so that the level of the output signal of the image sensor can be kept unvarying.

In the electronic camera arranged as shown in FIG. 1, power supply to unnecessary parts of the camera is either cut off or cut down according to the selected mode for the purpose of reduction in power consumption which is an important matter for an electronic camera. In the following list, parts to which power supply is to be effected in each of the different modes are indicated with the symbols of connection lines L1-L14 while power supply to all other parts is either cut off or cut down as mentioned above:

1) Monitor mode: L1-L4, L7 and L14
2) Recording mode: L1-L3, L5, L6, L8-L10
3) Monitor reproduction mode: L10, L11, L13 and L14
4) External monitor mode and external recording mode: L1-L3, L5 and L6
5) External reproduction mode: L10-L12

In the recording mode, the power supply may be effected via lines L13 and L14 in addition to the above-stated lines to operate thereby also the monitor 24. In order that the power supply to unnecessary parts is cut off or cut down for each of different modes as mentioned above, a rated voltage or current is supplied only to the connection lines indicated at items 1)-5) of the above list in response to the selecting operation of the selectors S1-S4 while power supply to other connection lines is either cut off or cut down. The selectors S1-S4 are arranged to operate according to the output of the mode setting circuit MS, so that the power supply can be automatically controlled by the output of the mode setting circuit MS. In a modification example of this power supply arrangement, the power supply source 27 of FIG. 1 is replaced with a micro-processor; the connection lines L1-L14 are used as signal lines between the micro-processor and each of the applicable parts while these parts are arranged to have power supply via connection lines which are separately provided; and thus the power supply to the above-stated unnecessary parts is either cut off or cut down under the control of the microprocessor.

Figure 7A:
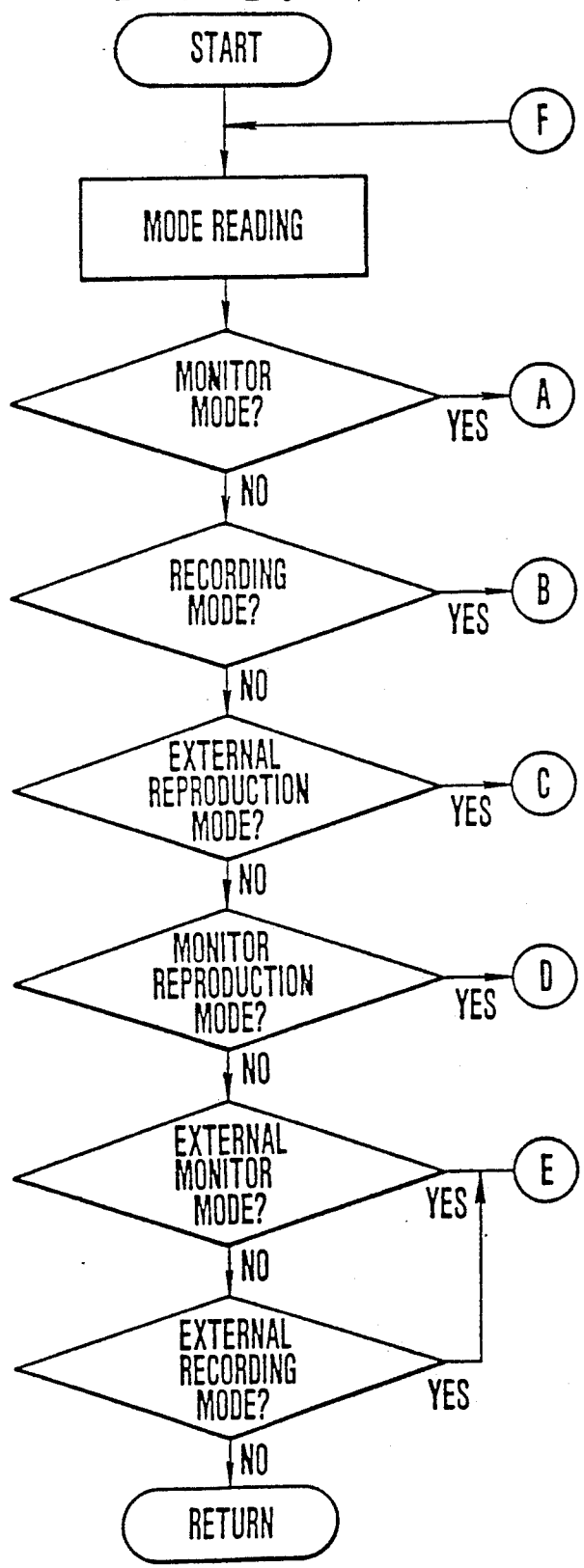
Figure 7B:
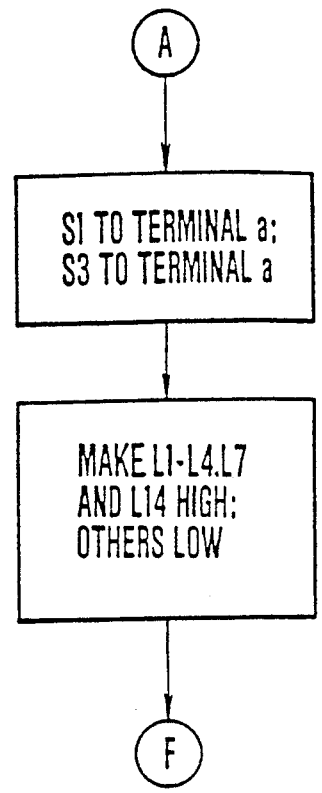

FIGS. 7(a)-7(f) are flow charts showing the above-stated control operation on the power supply. FIG. 7(a) shows a main routine, wherein the operating mode is read out. Then, the power supply is controlled in accordance with applicable one of subroutines shown in FIGS. 7(b)-7(f) according to the mode selected from the modes including the monitor mode, recording mode, external reproduction mode, monitor reproduction mode and external monitor mode (or external recording mode).

Further, in the case of FIG. 1, the circuit arrangement or circuit 7A, 7B constants of the driving control circuit, the image sensing signal processing circuit or reproduction signal processing circuit, etc. are arranged to be variable with the selected mode for reduction in power consumption and improvement in picture quality. For example, in the monitor mode, the driving control circuit 7A which is arranged to supply driving pulses suited for the mode and the image sensing signal processing circuit 9A which is arranged to process the output of the image sensor 4 produced in that mode are selected. Or, in case that these circuits are arranged in common with other circuits, the circuit constant is changed to a value suited for the selected mode. In the case of the image sensing mode such as the recording mode, the driving control circuit 7B and the image sensing signal processing circuit 9B are selected or, if these circuits are arranged in common with other circuits, the circuit constant is changed to a value suited for the image sensing mode. In the monitor reproduction mode, the reproduction signal processing circuit 21A is selected or, in case that the reproduction signal processing circuit is arranged in common with the other circuit, the circuit constant thereof is changed to a value suited for the monitor reproduction mode The circuit constant changing operation in each of the modes mentioned above may be automatically accomplished in response to mode selection by some mechanical or electric means. In case that a part of the driving control circuit, the image sensing signal processing circuit or the reproduction signal processing circuit is arranged in common with the other circuit while the remaining part is provided for one of the selectable modes, the remaining part of the circuit may be arranged to be selectable in the same manner as mentioned above.

Figure 8:
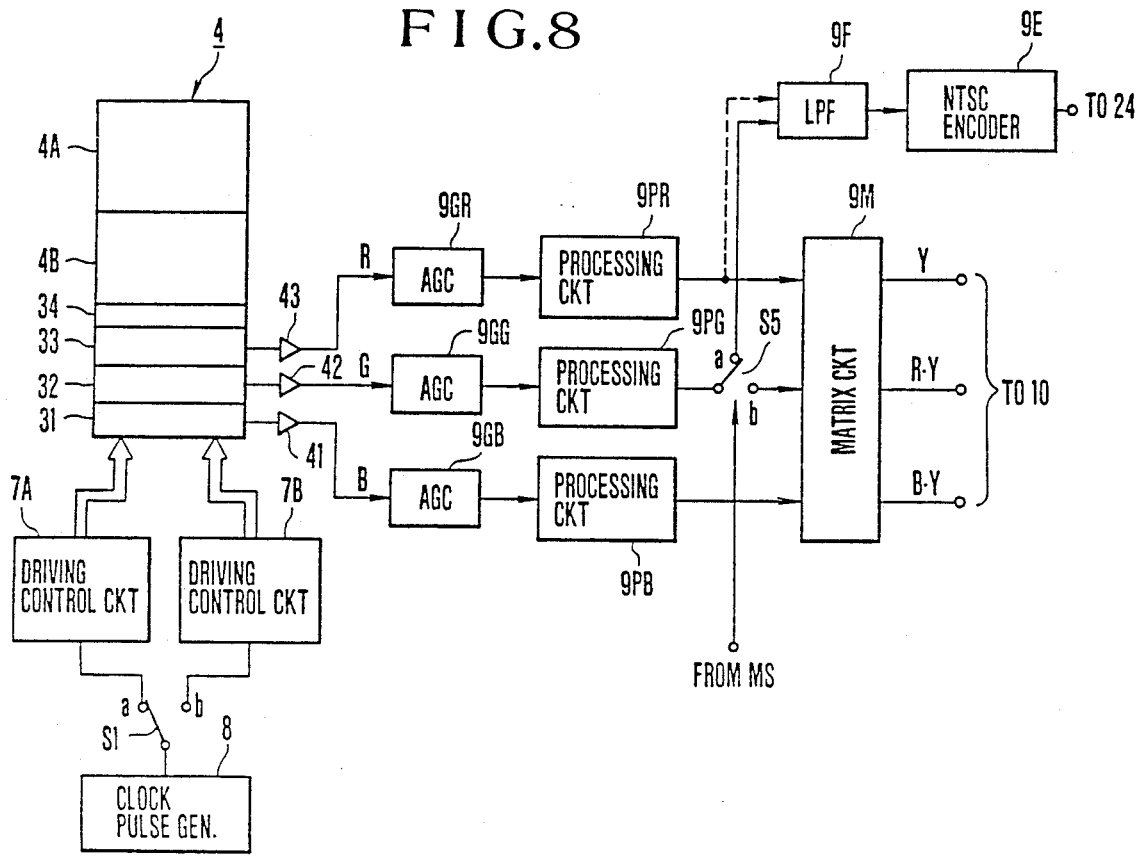
FIG. 8 is a block diagram showing, by way of example, the specific arrangement of the image sensor of FIG. 1 and the details of an image sensing signal processing circuit of FIG. 1.

A method for switching the image sensing signal processing circuit and the reproduction signal processing circuit according to the above-stated mode selection will be described by way of example below with reference to FIG. 8:

In the case of FIG. 8, a frame transfer type solid-state image sensor which is shown in FIG. 4 is employed as an example of the image sensor 4 of FIG. 1. The illustration includes AGC circuits 9GR, 9GG and 9GB which are respectively provided for signals R, G and B; signal processing circuits PR, 9PG and 9PB; and a matrix circuit 9M. In the image sensing mode such as the recording mode, a selector S5 is shifted to a position "b" thereof to allow a luminance signal Y, color difference signals R-Y and B-Y to be produced from the matrix circuit 9M to the recording signal processing circuit 10 of FIG. 1. A known circuit can be employed as each of the above-stated AGC circuits. Therefore, details of these circuits are omitted here. Meanwhile, in the monitor mode, the selector S5 is shifted to the other position "a" thereof in response to the output of the mode setting circuit MS. Then, for example, the signal G is produced as a black-and-white signal from the channel of this signal to the monitor 24 via a low-pass filter (LPF) 9F and an NTSC encoder 9E. Although this signal is not a chrominance signal, the NTSC encoder 9E is used for the purpose of permitting insertion of a synchronizing signal. With the mode setting circuit MS operated to effect switch-over between the monitor mode and the image sensing mode, an image sensing signal processing method is selected in this manner to suit for the selected mode. In this embodiment, a black-and-white signal is formed by using a G channel. This arrangement applies to a case where the register 32 is used for reading out a black-and-white video signal. However, where the picture element signals are to be added up by using the register 33, a luminance signal for the monitor mode is formed by using the output of the processing circuit 9PR. Such being the arrangement of this embodiment, a correct video signal is always obtainable even in the case where picture element signals are added up by means of one horizontal shift register within the image sensor which is arranged as shown in FIG. 8.

Figure 9:
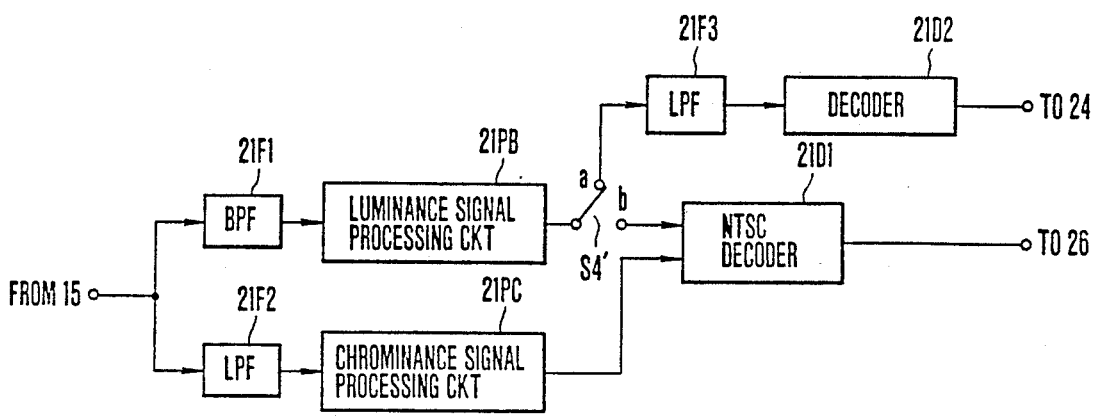
FIG. 9 is a block diagram showing the details of a reproduction signal processing circuit shown in FIG. 1.

FIG. 9 shows, by way of example, switching means for switching between the reproduction signal processing circuits 21A and 21B according to the mode selection mentioned in the foregoing. From the output of the reproduction amplifier 15 of FIG. 1, a luminance signal is separated by means of a band-pass filter 21F1 and a chrominance signal by a low-pass filter 21F2. These signals are then respectively processed by a luminance signal processing circuit 21PB and a chrominance signal processing circuit 21PC. In the reproduction mode using an external monitor, a selector S4' which corresponds to the selector S4 in terms of function is shifted to a position "b" thereof. The outputs of the processing circuits 21PB and 21PC are then supplied via an NTSC decoder 21D1 from an external video output terminal (26 of FIG. 1) to an external device. Whereas, in the reproduction mode using the built-in monitor (24 of FIG. 1), the above-stated selector S4' is shifted to a position "a" thereof. As a result, the output of the luminance signal processing circuit 21PB alone is supplied via a low-pass filter 21F3 and a decoder 21D2 to the monitor 24. A reproduction signal processing method is thus selected to suit for the reproduction mode selected between the mode using the built-in monitor 24 and another mode using the external monitor.

Therefore, in case of observing an image obtained by means of a black-and-white monitor of low resolution, the above-stated arrangement eliminates occurrence of a false signal.

What is claimed is:

1. An image monitor-displaying apparatus, comprising:
    image sensing means for sensing an image of an object and for generating an image signal corresponding to said object;
    output control means for outputting the image signal from said large sensing means on the basis of either a first output mode in which the image signal having a first resolution is outputted from said image sensing means or a second output mode in which the image signal having a second resolution lower than said first resolution is outputted from said image sensing means;
    monitor-displaying means for displaying the image signal outputted from said image sensing means on the basis of said second output mode; and
    displaying operation control means for giving an instruction to said output control means to effect an operation based on said first output mode without effecting a display by said monitor-displaying means, and for giving an instruction to said output control means to effect an operation based on said second output mode so as to output an image signal to produce the above-mentioned second resolution, while effecting a display by said monitor-displaying means.

2. An apparatus according to claim 1, wherein the resolution of said monitor-displaying means is lower than that of the image sensing means.

3. An apparatus according to claim 1, and further comprising feeding means for feeding the image signal outputted from said image sensing means on the first mode to peripheral means other than said monitor-displaying means.

4. An apparatus according to claim 3, wherein said peripheral means includes recording means.

5. An apparatus according to claim 3, wherein said peripheral means is included in an external device which can be connected through a signal line to said image monitor-displaying apparatus.

6. An apparatus according to claim 3, and further comprising switch means for selectively feeding the image signal outputted from said image sensing means to said peripheral means and said displaying means.

7. An apparatus according to claim 6, wherein said switch means is arranged to change over its state in response to change-over of said first mode and said second mode.

8. An image monitor-displaying apparatus, comprising:
- reproducing means for reproducing an image signal having a first resolution recorded on a recording medium;
- output means for outputting the image signal on a first output mode in which the image signal reproduced by said reproducing means is outputted while holding the first resolution or on a second output mode in which the image signal is outputted after the resolution is switched to a second resolution lower than said first resolution;
- monitor-displaying means for displaying the image signal outputted from said output means on the basis of said second output mode; and
- displaying operation control means for giving an instruction to said output means to effect an operation based on said first output mode, without effecting a display by said monitor-displaying means, and for giving an instruction to said output means to effect an operation based on said second output mode so as to output an image signal to produce the above-mentioned second resolution, while effecting a display by said monitor-displaying means.

9. An apparatus according to claim 8, and further comprising feeding means for feeding the image signal outputted from said output means on the first output mode to peripheral means other than said monitor-displaying means.

10. An apparatus according to claim 8, and further comprising switch means for selectively feeding the image signal outputted from said output means to said peripheral means and said displaying means.

11. An image monitor-displaying apparatus, comprising:
- image sensing means for sensing an image of an object and for generating a color image signal corresponding to said object and including a signal having a first resolution and representing a brightness;
- monitor-displaying means which can display a signal representing a brightness and having a resolution lower than said first resolution; and
- image signal output control means having a first output mode in which at least a signal representing a brightness in the color image signal generated by said image sensing means is outputted and fed to means other than said monitor-displaying means and a second output mode in which at least the signal representing the brightness in the color image signal generated by said image sensing means is outputted and fed to said monitor-displaying means, in which in the first output mode at least the signal representing the brightness in the color image signal generated by said image sensing means is outputted and fed to the means other than said monitor-displaying means, with the first resolution, and in the second output mode at least the signal representing the brightness in the color image signal generated by said image sensing means is outputted and fed to said monitor-displaying means after the first resolution is switched to the second resolution.

12. An apparatus according to claim 11, wherein the resolution of said monitor-displaying means is lower than that of the image sensing means.

13. An apparatus according to claim 11, wherein the means other than said monitor-displaying means includes recording means.

14. An apparatus according to claim 11, wherein the means other than said monitor-displaying means is included in an external apparatus which can be connected through a signal line to said image monitor-displaying apparatus.

* * * * *